(12) United States Patent
Palvölgyi et al.

(10) Patent No.: US 6,840,263 B2
(45) Date of Patent: Jan. 11, 2005

(54) MULTIFUNCTIONAL VALVE FOR THE FUEL TANK OF A MOTOR VEHICLE

(75) Inventors: Sandor Palvölgyi, Gleisdorf (AT); Günther Pozgainer, Graz (AT)

(73) Assignee: Tesma Motoren-Und Getriebetechnik GmbH, Sinabelkirchen (AT)

( * ) Notice: Subject to any disclaimer, the term of this patent is extended or adjusted under 35 U.S.C. 154(b) by 0 days.

(21) Appl. No.: 10/608,514

(22) Filed: Jun. 26, 2003

(65) Prior Publication Data

US 2004/0045602 A1 Mar. 11, 2004

(30) Foreign Application Priority Data

Jun. 27, 2002 (AT) ..................... GM417/2002

(51) Int. Cl.[7] ............................... F16K 24/04
(52) U.S. Cl. ......................... 137/202; 137/43
(58) Field of Search .................... 137/43, 202

(56) References Cited

U.S. PATENT DOCUMENTS 5,590,697 A * 1/1997 Benjey et al. ............. 137/202
6,085,771 A * 7/2000 Benjey et al. ............. 137/202
6,719,000 B1 * 4/2004 Forsythe et al. ........... 137/202

* cited by examiner

Primary Examiner—Gerald A. Michalsky
(74) Attorney, Agent, or Firm—Bachman & LaPointe, P.C.

(57) ABSTRACT

Multifunctional valve for the fuel tank of a motor vehicle. In order to fulfill all these requirements in terms of safety and the restriction of emissions with a valve in as simple a way as possible, the closing element (22) can be moved to a limited degree with respect the float (16), is acted on by a first spring (27) and has a small pressure equalization hole (25), an intermediate element (30) is provided on the float (16) and above the closing element (22) and can move to a limited degree with respect to the float (16) in the axial direction and is acted on by a second spring (35), and a seat plate (38) is arranged above the intermediate element (30) and is pressed downward against a second seat (43) by a third spring (39).

7 Claims, 3 Drawing Sheets

MULTIFUNCTIONAL VALVE FOR THE FUEL TANK OF A MOTOR VEHICLE

Figure 1:
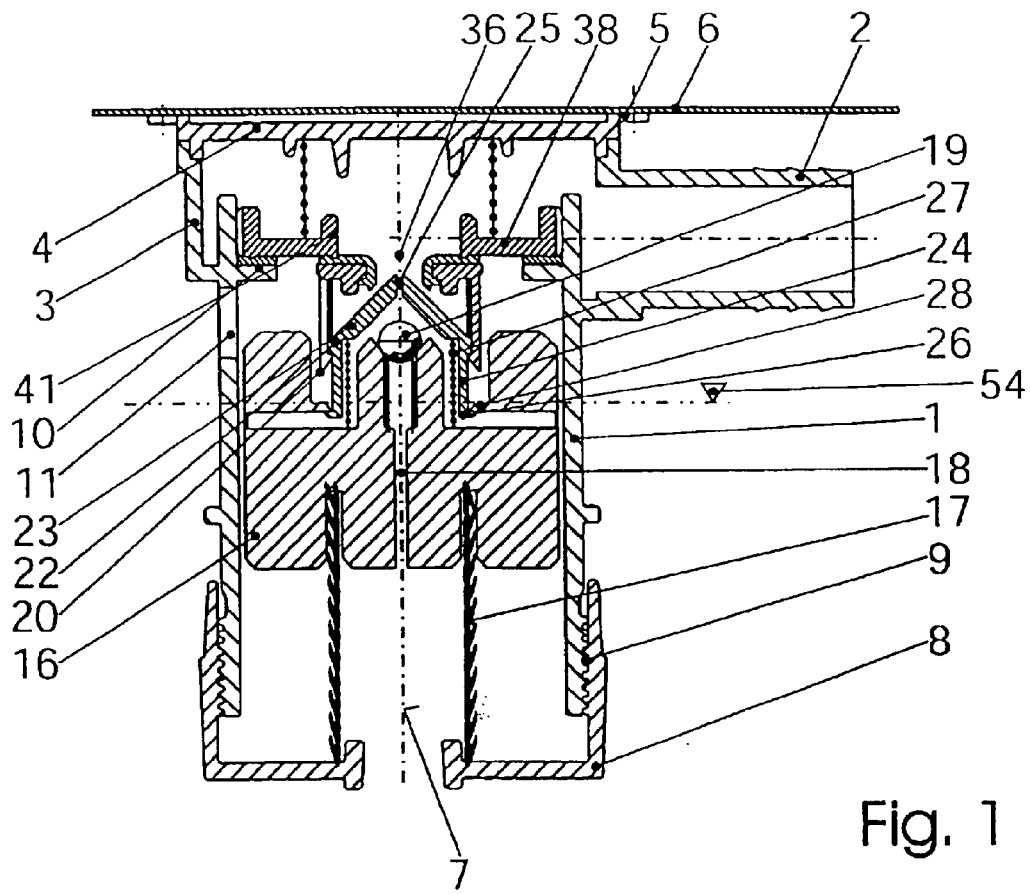

The invention relates to a multifunctional valve for the fuel tank of a motor vehicle, composed of a housing which is attached to the roof of a fuel tank, dipping at least partially therein and has a vertical axis, of a float which is guided in the direction of the axis, and of a closing element which is attached to said float.

Such valves are used in fuel tank systems where they are arranged spatially separate from the filling pipe and are connected to a filter for the adsorption of fuel vapors. Such systems with an adsorption filter are necessary today in order to fulfill the legal requirements in terms of the release of fuel vapors when refueling and as a result of natural evaporation.

However, the valve must fulfill a plurality of functions as the adsorption filter must not come into contact with the liquid fuel under any circumstances and as, in addition, during refueling, on the one hand large quantities of air/vapor mixture are expelled and, on the other hand, when the maximum filling level in the tank is reached the pressure must rise to such an extent that the sniffing sensor of the filling nozzle responds. In addition, it is also necessary to ensure that the tank does not leak when the vehicle rolls over.

U.S. Pat. No. 5,590,697 discloses a refueling limiting valve which also establishes the connection to an adsorption filter and comprises an overpressure valve. The closing element firstly closes partially and then entirely. A disadvantage with this valve is that if there is a sudden escape of vapor an overpressure can be generated which is then vented into the surroundings via the overpressure valve. If the deactivation during refueling also takes place in two stages, a small overpressure may then remain, which leads to an undesired escape of fuel when the closure is opened. The intention is also to permit a slow reduction in pressure even when the valve is closed.

The object of the invention is to fulfill all these requirements in terms of safety and the restriction of emissions with a valve in the simplest possible way.

According to the invention this is achieved in that
a) the closing element can be moved to a limited degree with respect to the float in the axial direction, is acted on by a first spring and has a small pressure equalization hole,
b) an intermediate element is provided on the float and above the closing element and can move to a limited degree with respect to the float in the axial direction and is acted on by a second spring,
c) the intermediate element has a plate with an outermost edge, which plate has a first through-flow opening whose edge forms a first seat for the closing element located below it, and
d) a seat plate is arranged above the intermediate element and pressed downward against a second seat by a third spring, and has a second, larger through-flow opening whose edge forms a second seat for the intermediate element.

Owing to the limited mobility and owing to the first spring, the closing element is entrained when the float drops, but is pressed onto the valve seat with a defined force when closing takes place. Thus, during refueling the overpressure which is necessary to switch off the filling nozzle is reached. The pressure equalization hole is so small that after switching off takes place it brings about a pressure equalization. The intermediate element fulfills a double function. On the one hand, it forms the valve seat for the closing element and, on the other hand, during refueling it clears a large passage cross section for the expelled mixture to escape. The second spring is weaker than the first and thus also counteracts the movement of the closing element in a damping fashion. The limitation of the movement of the intermediate element ensures that it is entrained by the closing element during refueling and thus clears the large cross section.

This large passage cross section opens between the intermediate element and the seat plate arranged thereon, the seat plate itself forming the mobile valve part of an overpressure valve. If the pressure in the tank exceeds a predefined limiting value, the seat plate is lifted off counter to the force of a third spring and the pressure equalization takes place via the same output tube as the refueling venting into the adsorption filter. For this purpose, the seat plate has an outermost edge which is pressed by the third spring onto a third seat which is fixed to the housing.

In one development of the invention, the float rests on a fourth spring whose force is smaller than the force of gravity acting on the float. When the float is not floating, said force keeps it suspended so that it floats upward at a specific level of the liquid. Furthermore, the force which is exerted on the float by the third spring can be set by adjusting the housing floor. The specific level of the liquid can thus be set precisely.

In one preferred embodiment, the closing element is composed of a conical closing part and an outer casing part which has first hooks which interact with first stops on the float in order to limit the movement of the closing element in the axial direction, and the intermediate element has second hooks which are directed downward from the plate and interact with second stops on the closing element in order to limit the movement in the axial direction. In this way, parts are obtained which are particularly simple and easy to assemble.

In one development of the invention, the float has a central hole which ends in a space which is formed between the float and the closing element, and in which space there is a ball, and in which the closing element has a hole above the ball. An overhead valve which reliably closes entirely when the vehicle rolls over is thus also provided with minimum expenditure.

Figure 2:
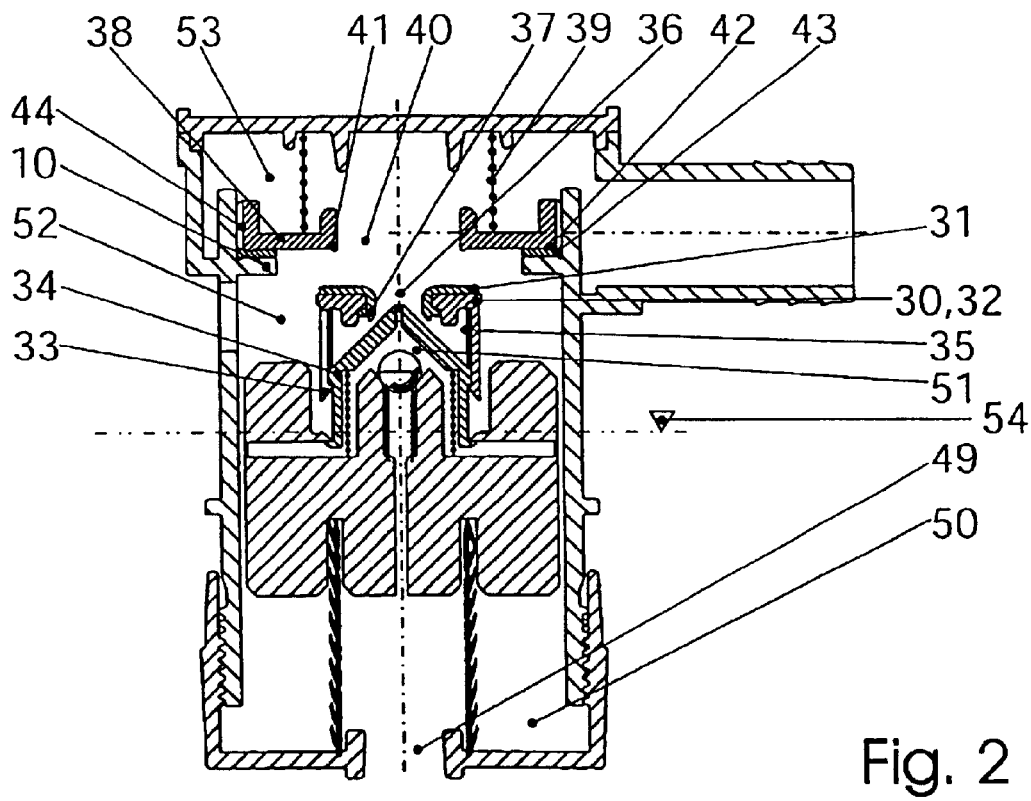
Figure 3:
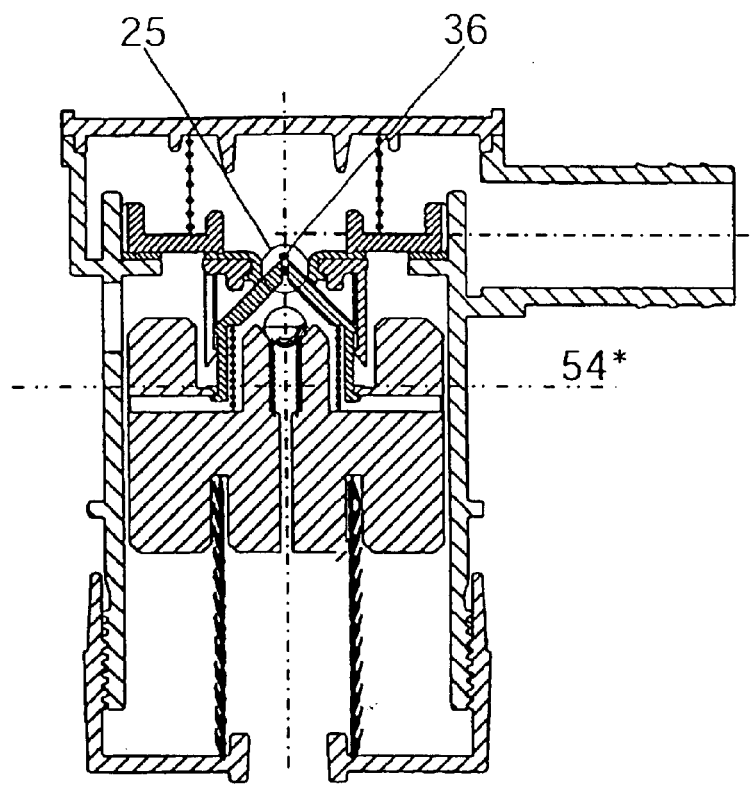
Figure 4:
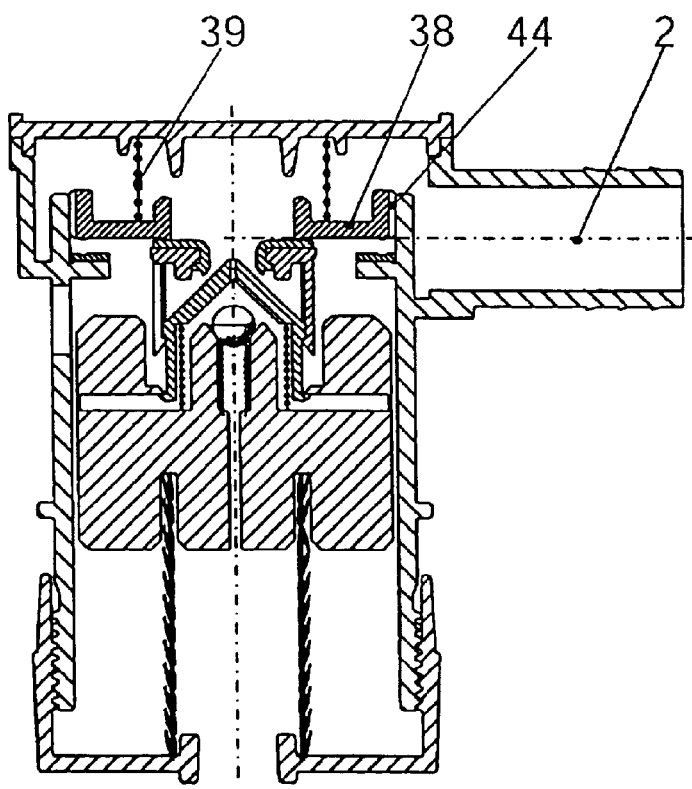
Figure 5:
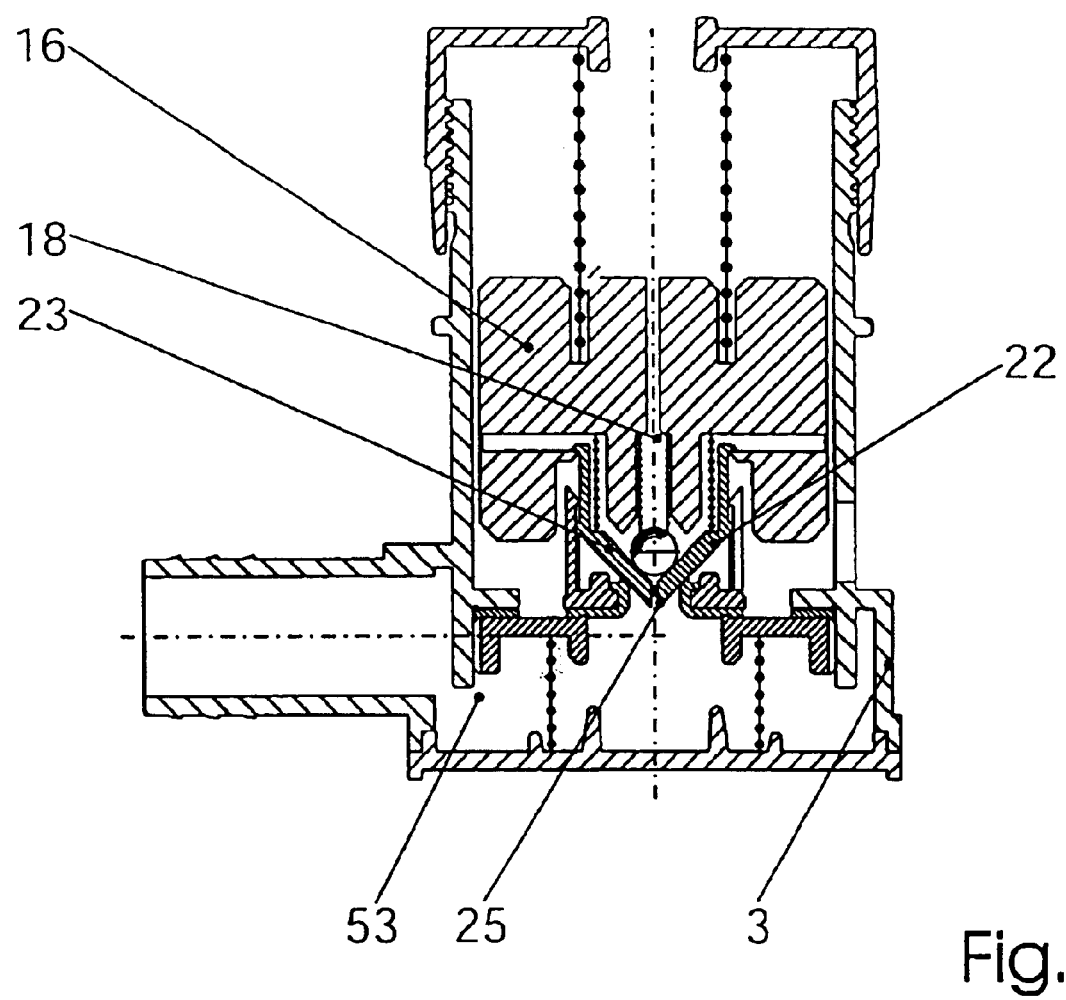

The invention will be described and explained below with reference to vertical sections through a preferred embodiment. They represent the following operating states:

FIG. 1: ventilation in the driving mode,
FIG. 2: ventilation during refueling,
FIG. 3: limiting of refueling,
FIG. 4: pressure relief in the case of overpressure,
FIG. 5: rolling over of the vehicle In FIG. 1, the essentially cylindrical housing is designated by 1. It merges at the top with a housing upper part 3, from which a discharge connector 2 leads to an adsorption filter (not illustrated), and which is closed off at the top by a housing lid 4. The latter, or the housing upper part 3, has a plurality of lugs 5 by means of which the entire unit is attached from the inside to the roof wall 6 of a fuel tank (otherwise no longer illustrated). At its lower end, a housing floor 8 is provided whose height can be set by means of an adjustment thread. To the side of housing 1 there is at least one inlet opening 11, and above it a circumferential collar 10. The vertical axis of the entire housing is designated by 7.

A float 16 which rests on a fourth spring 17 can move in the housing 1 in the vertical direction. By adjusting the housing floor 8, the force which is exerted by it on the float 16 can be set, and the level of liquid at which the valve closes can thus also be set. The float 16 has a central hole 18 which passes through it over its entire height and on whose upper edge a ball 19 rests. In addition, the float 16 has an upwardly open coaxial annular groove 20. A closing element 22 dips into the latter with its outer casing part 24. This outer casing part 24 does not need to be a continuous outer casing, it may also be composed of individual vertical laminas. The closing element 22 is composed of this outer casing part 24 and of a conical closing part 23 which has a central pressure equalizing hole 25 in the tip of the conical closing part 23. The outer casing part 24 has, at its lower end, first hooks 26 which are pressed by the upward acting first spring 27 against first stops 28 in the annular grove 10 of the float 16.

In FIG. 2, an intermediate element is designated by 30. It is composed of a plate 32, second hooks 33 which engage downward from the latter, and a seal 31 which forms a first through-opening 36 with its inner edge. The second hooks 33 are pulled upward by a second spring 35 against second stops 34 on the closing element 22. The seal 31 is turned inward in the first through-opening 36 and forms a seat there for the closing element 22. In addition, the intermediate element 30 interacts by means of its seal 31 with a seat plate 38 in a sealing fashion in certain operating states, which seat plate 38 is pressed downward by a third spring 39 against the circumferential collar 10. With its inner edge 41, the seat plate 38 forms a second, very large through-opening 40. The inner edge 41 is the seat face for the outermost edge of the seal 31 of the intermediate element 30. With its outermost edge 42, the seat plate 38 rests on a second seat 43 on the circumferential collar 10 of the housing 1. Vertical ducts, which together form a large passage cross section are formed distributed over the circumference between the outermost edge 42 of the seat plate 38 and the wall of the housing 1.

The following spaces are formed with these installed elements: under the float 16 a floating space 50 which is connected to the tank through an inlet opening 49; a space 51 in which the ball 19 is enclosed between the float 16 and the outer casing part 24 of the closing element 22; a vapor space 52 which is connected via the opening 11 to the vapor space in the interior of the gasoline tank between the part of the float 16 outside the annular groove 20 and the housing 1; and a head space 53 from which the discharge connector 52 leads to an adsorption filter. The level of liquid is designated by 54.

In FIG. 1, the level 54 of liquid is rather high but below the maximum (54*  in FIG. 3). The intermediate element 30 bears against the inner edge 41 of the seat plate 38. However, the conical closing part 23 of the closing element 22 leaves open the first through-opening 36 whose cross section is relatively small. In this position, a continuous equalization of pressure takes place between the interior of the fuel tank and the ambient air, via the adsorption filter, for example when there is slow vaporization in the tank on hot days.

In FIG. 2, the tank is rather empty and the weight of the float 16 rests on the fourth spring 17. The closing elements 22 and intermediate element 40 which are connected to the float 16 are also far down and they clear the large second through-opening 40. Through this opening, the vapor which is expelled when the inflowing liquid is refueled can escape quickly. Finally,—when the tank is already rather full—the level 54 of liquid will raise the float 16, into the position, firstly in FIG. 1, in which the second through-opening 40 is already closed by the intermediate element 30, and only the smaller first through-opening 36 is open any more, and then into the position in FIG. 3.

When the position in FIG. 3 is reached, the closing element 22 is also pressed against the intermediate element 30 and the first through-opening 36 is also closed. This takes place in a damped fashion because the second spring 35 counteracts the first spring 27. The first through-opening 36 is nevertheless closed so quickly that the pressure in the interior of the tank rises strongly, which leads to the fuel nozzle cutting out. Normally, there would now be an overpressure in the interior of the tank, which could lead, for example, to spraying when the filling nozzle is pulled out. In order to prevent this, the pressure equalization hole 25 is provided, its very small cross section permitting a slow equalization pressure.

FIG. 4 illustrates the first emergency case. The pressure in the interior of the tank would suddenly rise very strongly. Here, the force exerted by the high pressure on the seat plate 38 overcomes the force of the third spring 39. The seat plate 38 is lifted out and the ducts 44 which lead past the side of the seat plate 38 are cleared. The vapor which is released is also directed out of the head space 53 to the adsorption filter through the same discharge connector 2.

FIG. 5 illustrates the next emergency case: the vehicle has rolled over and is resting with the wheels upward. For this reason, the housing upper part 3 is also at the bottom. The entire hydrostatic pressure exerted by the liquid then loads the float and also acts on the ball 19 through the central hole 18. Said ball 19 is pressed, possibly supported by a small spring, against the conical closing part 23 of the closing element 22 from the inside, and as a result against the pressure equalization hole, and thus closes tank hermetically. Nothing can flow into the head space 53, and thus neither into the adsorption filter or into the open air.

What is claimed is:

1. A mutifunctional valve for the fuel tank of a motor vehicle, comprising a housing which is attached to a roof of a fuel tank, dipping at least partially therein and has a vertical axis, of a float which is guided in a direction of the axis, and of a closing element which is attached to said float, wherein
   a) the closing element (22) can be moved to a limited degree with respect to the float (16) in the axial direction (49), is acted on by a first spring (27) and has a small pressure equalization hole (25),
   b) an intermediate element (30) is provided on the float (16) and above the closing element (22) and can move to a limited degree with respect to the float (16) in the axial direction and is acted on by a second spring (35),
   c) the intermediate element (30) has a plate (32) with an outermost edge, which plate has a first through-flow opening (36) whose edge (37) forms a first seat for the closing element (22) located below it, and
   d) a seat plate (38) is arranged above the intermediate element (30) and pressed downward against a second seat (43) by a third spring (39), and has a second, larger through-flow opening (40) whose edge (41) forms a second seat for the intermediate element (30).

2. The multifunctional valve as claimed in claim 1, wherein the float (16) rests on a fourth spring (17) whose force is smaller than the force of gravity acting on the float (16).

3. The multifunctional valve as claimed in claim 1, wherein a force exerted on the float (16) by the third spring (39) can be set by adjusting a housing floor (8).

4. The multifunctional valve as claimed in claim 1, wherein the closing element (22) is composed of a conical closing part (23) and an outer casing part (24) which has first hooks (26) which interact with first stops (28) on the float (16) in order to limit the movement in the axial direction.

5. The multifunctional valve as claimed in claim 4, wherein the intermediate element (30) has second hooks (33) which are directed downward from the plate (32) and interact with second stops (34) on the closing element (22) in order to limit the movement in the axial direction.

6. The multifunctional valve as claimed in claim 1, wherein the seat plate (38) has an outermost edge (42) which is pressed by the third spring (39) onto a third seat (43) which is fixed to the housing.

7. The multifunctional valve as claimed in claim 1, wherein the float (16) has a central hole which ends in a space (51) formed between the float (16) and the closing element (22), and in which space there is a ball (19), and wherein the closing element (22) has a hole (25) above the ball (19).

* * * * *